United States Patent
Dunn et al.

(10) Patent No.: US 9,526,352 B2
(45) Date of Patent: Dec. 27, 2016

(54) WIRELESS VIDEO TRANSMISSION SYSTEM FOR LIQUID CRYSTAL DISPLAY

(71) Applicant: Manufacturing Resources International, Inc., Alpharetta, GA (US)

(72) Inventors: William Dunn, Alpharetta, GA (US); Marcos Diaz, Alpharetta, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 32 days.

(21) Appl. No.: 14/741,118

(22) Filed: Jun. 16, 2015

(65) Prior Publication Data

US 2015/0366083 A1    Dec. 17, 2015

Related U.S. Application Data

(60) Provisional application No. 62/013,225, filed on Jun. 17, 2014, provisional application No. 62/012,559, filed on Jun. 16, 2014.

(51) Int. Cl.
*G02F 1/1333*    (2006.01)
*A47F 3/00*    (2006.01)
*A47F 3/04*    (2006.01)

(52) U.S. Cl.
CPC ......... *A47F 3/005* (2013.01); *G02F 1/133308* (2013.01); *A47F 3/0434* (2013.01); *G02F 2001/133311* (2013.01)

(58) Field of Classification Search
CPC .................................................. G02F 1/1333
See application file for complete search history.

(56) References Cited

U.S. PATENT DOCUMENTS

| | | | |
|---|---|---|---|
| 4,299,092 A | 11/1981 | Ibrahim | |
| 7,922,381 B2 | 4/2011 | Han | |
| 8,683,745 B2 | 4/2014 | Artwohl | |
| 9,052,536 B2* | 6/2015 | Artwohl | A47F 3/0434 |
| 2002/0075552 A1* | 6/2002 | Poll | E06B 3/66 |
| | | | 359/275 |
| 2002/0187575 A1* | 12/2002 | Maruyama | H01L 51/5259 |
| | | | 438/33 |
| 2005/0265019 A1 | 12/2005 | Sommers | |
| 2007/0151274 A1 | 7/2007 | Roche | |
| 2007/0171647 A1 | 7/2007 | Artwohl | |
| 2008/0055534 A1 | 3/2008 | Kawano | |
| 2008/0284942 A1 | 11/2008 | Mahama | |
| 2009/0002990 A1 | 1/2009 | Becker | |
| 2009/0015400 A1 | 1/2009 | Breed | |

(Continued)

FOREIGN PATENT DOCUMENTS

CN    CN202815379    3/2013

*Primary Examiner* — Timothy L Rude
(74) *Attorney, Agent, or Firm* — Standley Law Group LLP

(57) ABSTRACT

The exemplary embodiments herein provide a sealed transparent LCD assembly having a front and rear glass panel with a spacer positioned between the two panels to provide a sealed cavity containing a liquid crystal display (LCD). A wireless transmitter/receiver may be placed within the sealed cavity to receive image or video data wirelessly. The sealed transparent LCD assembly may be used with a display case which defines a cavity housing a second wireless transmitter/receiver which can push the image or video data to the wireless transmitter/receiver contained within the sealed cavity between the two glass panels.

20 Claims, 6 Drawing Sheets

(56) References Cited

U.S. PATENT DOCUMENTS

| | | | |
|---|---|---|---|
| 2010/0162747 A1 | 7/2010 | Hamel | |
| 2010/0238394 A1* | 9/2010 | Dunn | G02F 1/133385 349/161 |
| 2011/0083460 A1 | 4/2011 | Thomas | |
| 2011/0116000 A1* | 5/2011 | Dunn | G02F 1/133382 349/58 |
| 2011/0116231 A1 | 5/2011 | Dunn | |
| 2012/0287368 A1 | 11/2012 | Que et al. | |
| 2013/0016296 A1* | 1/2013 | Fujita | H01L 27/322 349/42 |
| 2013/0063326 A1 | 3/2013 | Riegel | |
| 2013/0265525 A1 | 10/2013 | Dunn | |
| 2013/0271696 A1 | 10/2013 | Dunn | |
| 2014/0078407 A1 | 3/2014 | Green | |
| 2014/0085564 A1 | 3/2014 | Hendren et al. | |
| 2014/0104538 A1 | 4/2014 | Park | |
| 2014/0144083 A1 | 5/2014 | Artwohl | |
| 2015/0250021 A1 | 9/2015 | Stice et al. | |
| 2015/0253612 A1* | 9/2015 | Hasegawa | G02F 1/133308 349/58 |
| 2015/0362667 A1* | 12/2015 | Dunn | G02B 6/0088 349/65 |
| 2015/0362768 A1* | 12/2015 | Dunn | G02F 1/1339 349/65 |
| 2015/0362792 A1* | 12/2015 | Dunn | A47F 3/043 349/65 |
| 2015/0363819 A1* | 12/2015 | Dunn | G06Q 30/0242 705/14.41 |
| 2015/0366083 A1* | 12/2015 | Dunn | G02F 1/133308 349/1 |
| 2016/0037657 A1* | 2/2016 | Yoshizumi | G06F 1/1652 361/679.01 |
| 2016/0091755 A1* | 3/2016 | Dunn | G02F 1/133528 349/65 |
| 2016/0095450 A1* | 4/2016 | Trulaske, Sr. | A47F 11/10 312/116 |
| 2016/0103275 A1* | 4/2016 | Diaz | G02B 6/0073 349/65 |
| 2016/0106231 A1* | 4/2016 | Dunn | G06F 3/1423 345/87 |

\* cited by examiner

WIRELESS VIDEO TRANSMISSION SYSTEM FOR LIQUID CRYSTAL DISPLAY

CROSS-REFERENCE TO RELATED APPLICATIONS

This application claims priority to U.S. Provisional Application No. 62/013,225 filed on Jun. 17, 2014 and is herein incorporated by reference in its entirety. This application also claims priority to U.S. Provisional Application No. 62/012,559 filed on Jun. 16, 2014 and is herein incorporated by reference in its entirety.

TECHNICAL FIELD

Embodiments generally relate to video transmission systems for transparent liquid crystal displays (LCD) sometimes used within display cases.

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides a wireless transmission system for a transparent LCD assembly. A first wireless transmitter/receiver is position in a cavity below the display case while a second wireless transmitter/receiver is positioned on a mounting plate above or below the LCD. The LCD, mounting plate, and second wireless transmitter/receiver are preferably sandwiched between a front and rear glass. The mounting plate is preferably bonded to and in thermal communication with the rear glass so that any heat generated by the wireless transmitter/receiver can be transferred to the rear glass for removal by natural or forced convection.

LEDs are preferably arranged along the top and bottom edges of a two way light guide which permits the light to exit both the front and rear surface of the light guide. The top LEDs are preferably placed in thermal communication with a top plate which is placed in conductive thermal communication with the rear glass. Similarly, the bottom LEDs are preferably placed in thermal communication with a bottom plate which is also placed in conductive thermal communication with the rear glass. The top and bottom plates permit the heat to spread out and transfer to the rear glass where it can be removed by forced or natural convection.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
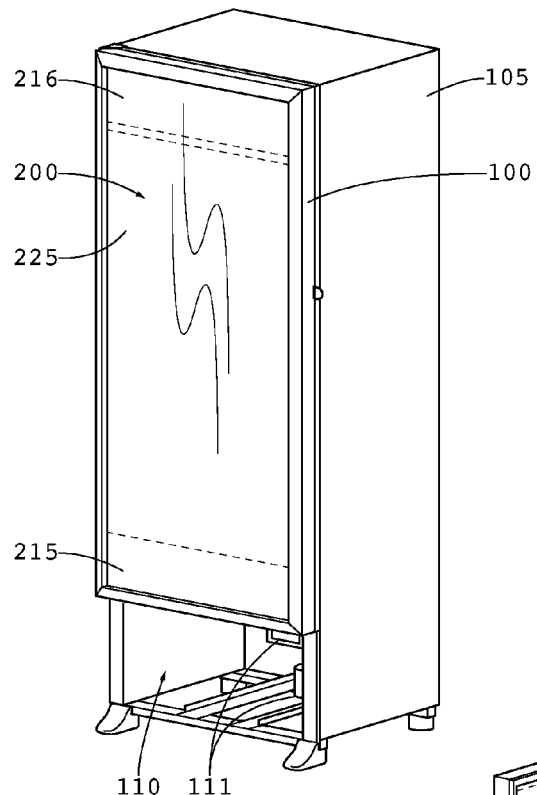
FIG. 1 is a perspective view of a display case having a transparent LCD assembly with an exemplary wireless transmission system.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a display case having a transparent LCD 200. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located. The electrical devices 111 may include any or all of the following: power modules, timing and control board (TCON), video player, hard drive/electronic storage, microprocessor/CPU, wireless transmitter/receiver, cellular data transmitter/receiver, and internet connectivity. At least some of the electrical devices 111 are in electrical communication with the transparent LCD 200.

Figure 2:
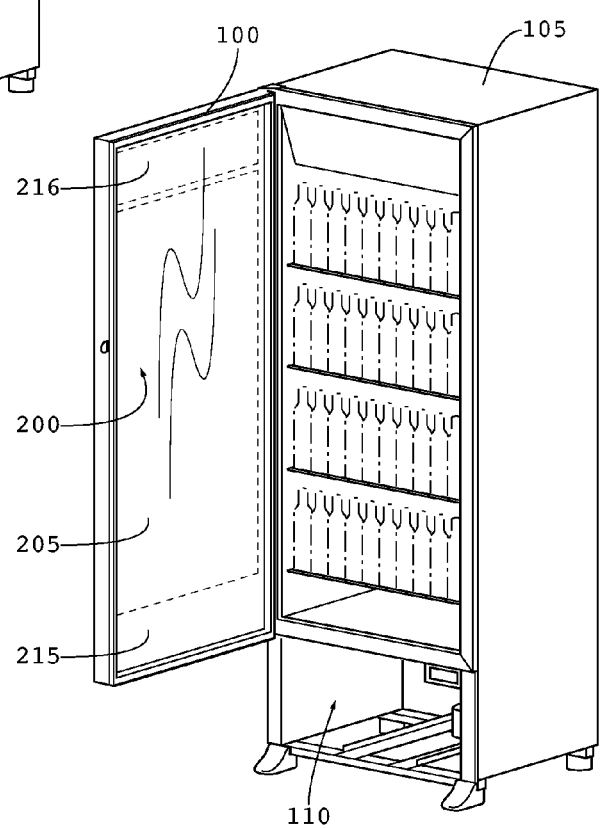
FIG. 2 is a perspective view of the display case of FIG. 1 where the door has been opened.

FIG. 2 is a perspective view of the display case of FIG. 1 where the door has been opened. The transparent LCD 200 is preferably sandwiched between a front glass 225 and rear glass 205. Also preferably sandwiched between the front and rear glass 225/205 is an upper plate 216 and a lower plate 215, each of which are preferably attached to the rear glass 225 such that heat from the plates can be conductively transferred to the rear glass 225 and removed by natural or forced convection.

In an exemplary embodiment, the upper and lower plates are preferably bonded to the rear glass 205 through adhesive transfer tape. An exemplary adhesive transfer tape for this purpose would be 468 MP, available commercially from 3M™ of St. Paul, Minn. www.3M.com/converter In order to illuminate the transparent LCD 200, one or more printed circuit boards (PCBs) each containing a plurality of LEDs is preferably in conductive thermal communication with either the upper, lower, or both plates. In this way, heat that is generated by the LEDs can be transmitted to the PCB and eventually transferring to the rear glass 205 where the heat can dissipate through natural or forced convection.

Figure 3:
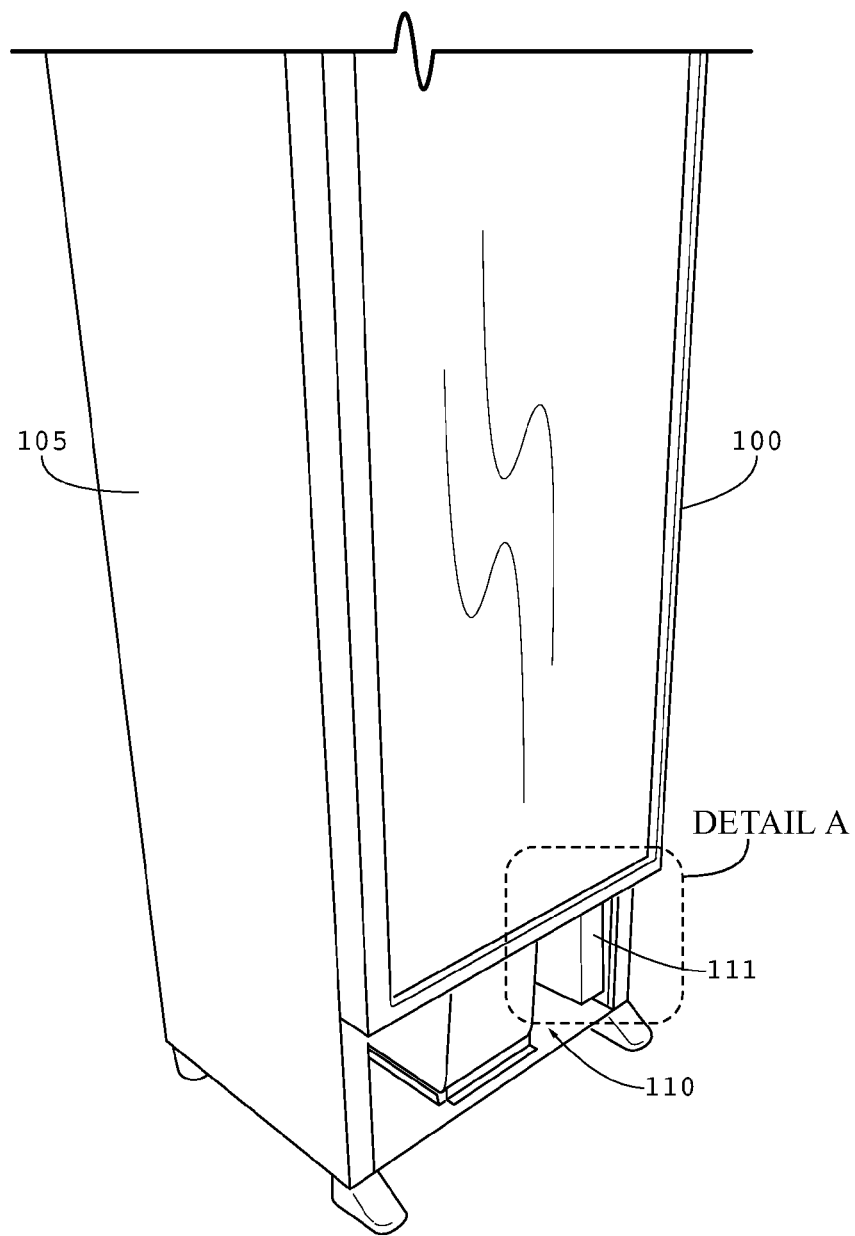
FIG. 3 is a perspective view of the display case of FIG. 1 showing the cavity for electronic devices as well as the location of Detail A.
Figure 4:
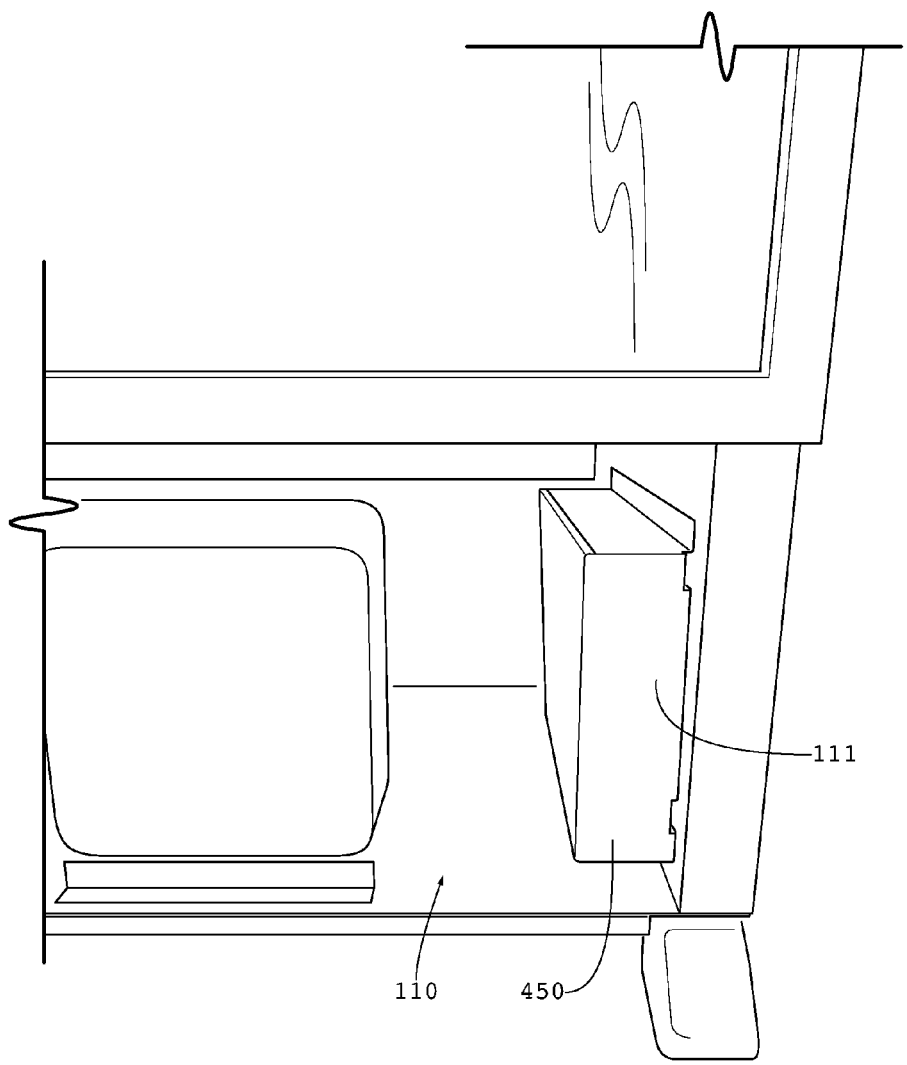
FIG. 4 is a front view of Detail A shown in FIG. 3.

FIG. 3 is a perspective view of the display case of FIG. 1 showing the cavity for electronic devices 111 as well as the location of Detail A. FIG. 4 is a front view of Detail A shown in FIG. 3. Here, a wireless transmitter/receiver 450 is shown within the cavity 110 and included with the electrical devices 111.

Figure 5:
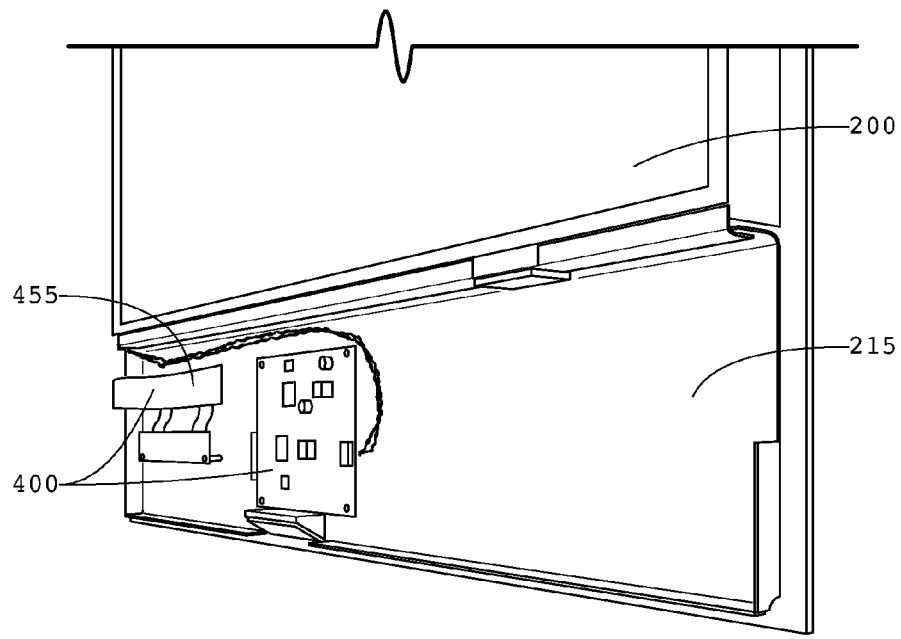
FIG. 5 is a perspective view showing a lower mounting plate and various electronic devices.

FIG. 5 is a perspective view showing a lower mounting plate 215 and various electronic devices 400 in electrical communication with the LCD 200. A second wireless transmitter/receiver 455 is also preferably positioned on the lower mounting plate 215 and may communicate electronically with the wireless transmitter/receiver 450 shown within the cavity 110. A plurality of different signals can be transmitted between the two wireless devices 450/455 including but not limited to: image/video data, visual alerts, image inspection/test patterns, temperature of the display case, and feedback data from the LCD 200 such as brightness, color saturation, color temperature, gamma, and contrast ratio.

Figure 6:
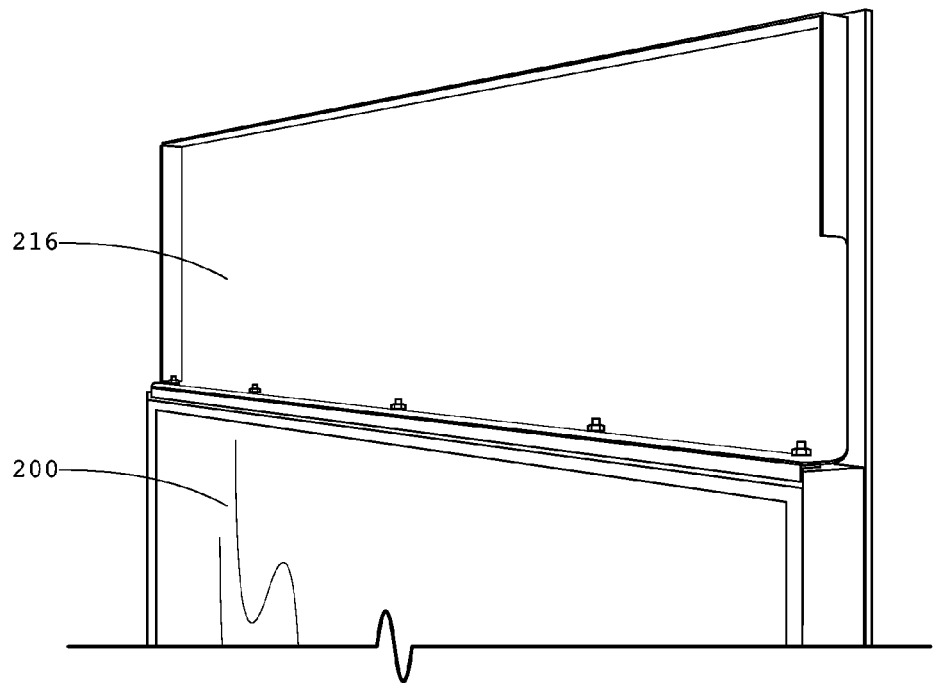
FIG. 6 is a perspective view showing an upper mounting plate.

As noted above, preferably the electronic devices 400 are in conductive thermal communication with the plate 215 which is preferably bonded to and in conductive thermal communication with the rear glass 205 so that heat generated by the electronic devices 400 can be removed. Similarly, FIG. 6 is a perspective view showing an upper mounting plate which can also be used to mount various electronic devices and is also preferably bonded to and in conductive thermal communication with the rear glass 205.

The wireless devices 450/455 can operate under any form of wireless networking technology, including but not limited to: WPAN, WLAN, a wireless mesh network, or GAN. Specifically regarding the architecture for a WLAN network, these could include but are not limited to stations, basic service set, extended service set, and a distribution system. Further regarding the types of wireless LANs, these could include but are not limited to peer-to-peer, bridge, and a wireless distribution system. Any form of general encryption method can be used with the exemplary embodiments herein.

In a preferred embodiment, the lower plate 215 would extend horizontally as far as possible, preferably to the same horizontal width as the LCD 230 and may extend 4-14 inches in vertical width, depending on the application. Although shown attached to the lower plate 215, electrical devices 400 could also be mounted to the upper plate 216.

In a preferred embodiment, the upper plate 216 would extend horizontally as far as possible, preferably to the same horizontal width as the LCD 200. The upper plate 216 may also extend 4-14 inches in vertical width, depending on the application. While not required, it is also preferred that the lower plate 215 and the upper plate 216 are within 15% of the same surface area. In other words, it is preferred that the plates 215/216 are substantially the same surface area. This is not required however, as some embodiments may require a larger surface area for the plate which would contain the electrical devices 400, or a larger surface area for the top plate 216 as compared to the bottom plate 215. It is preferred that the plates are both metallic, and most preferably aluminum, but they can be any material that has good thermal conductivity.

Figure 7:
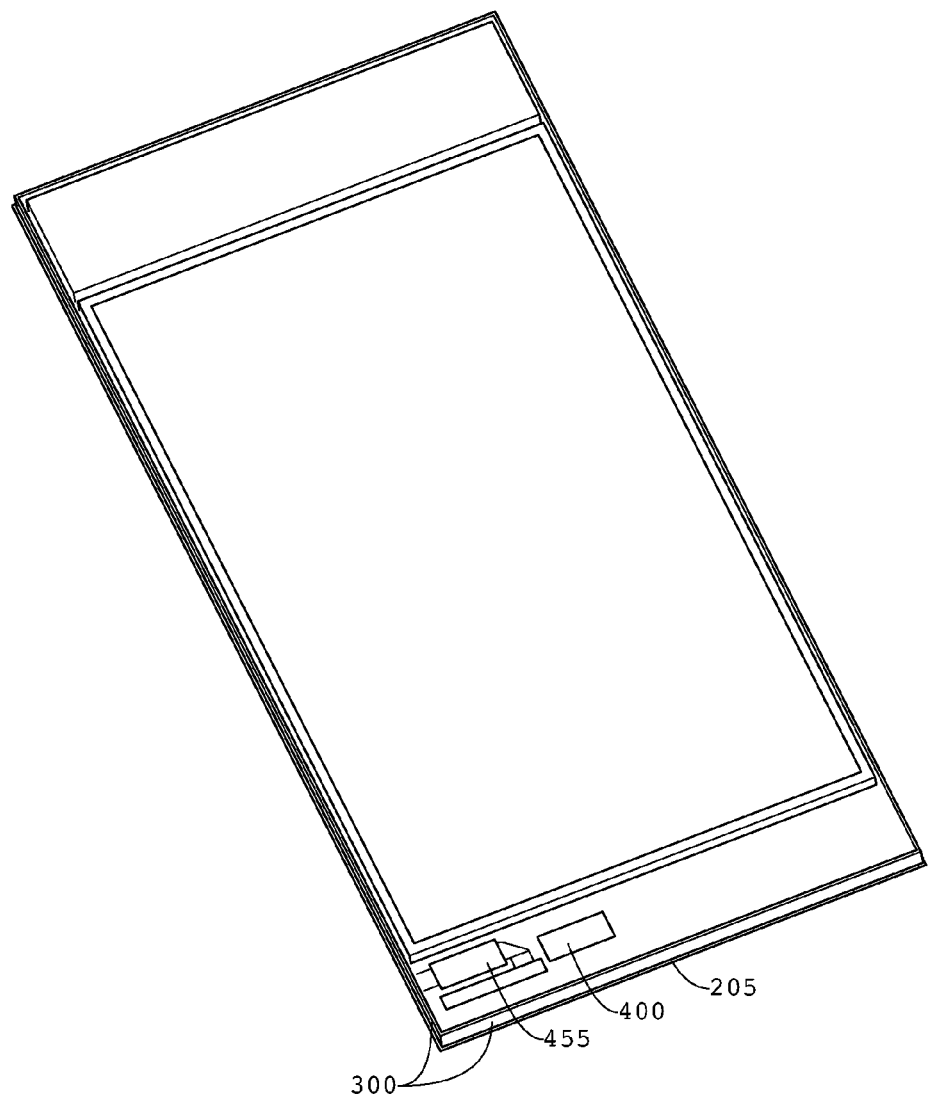
FIG. 7 is a perspective view of a partially assembled exemplary embodiment of a sealed transparent LCD assembly.

FIG. 7 is a perspective view of a partially assembled exemplary embodiment of a sealed transparent LCD assembly 200. Here, the front glass 225 has been removed to show the interior of the sealed assembly 200. This view shows the rear glass 205 with the spacer 300 attached around the perimeter of the glass 205. The various electronic devices 400 as well as the second wireless transmitter/receiver 455 are shown attached to the bottom plate 215 and sealed between the rear glass 205 and front glass 225 (not shown here).

Figure 8:
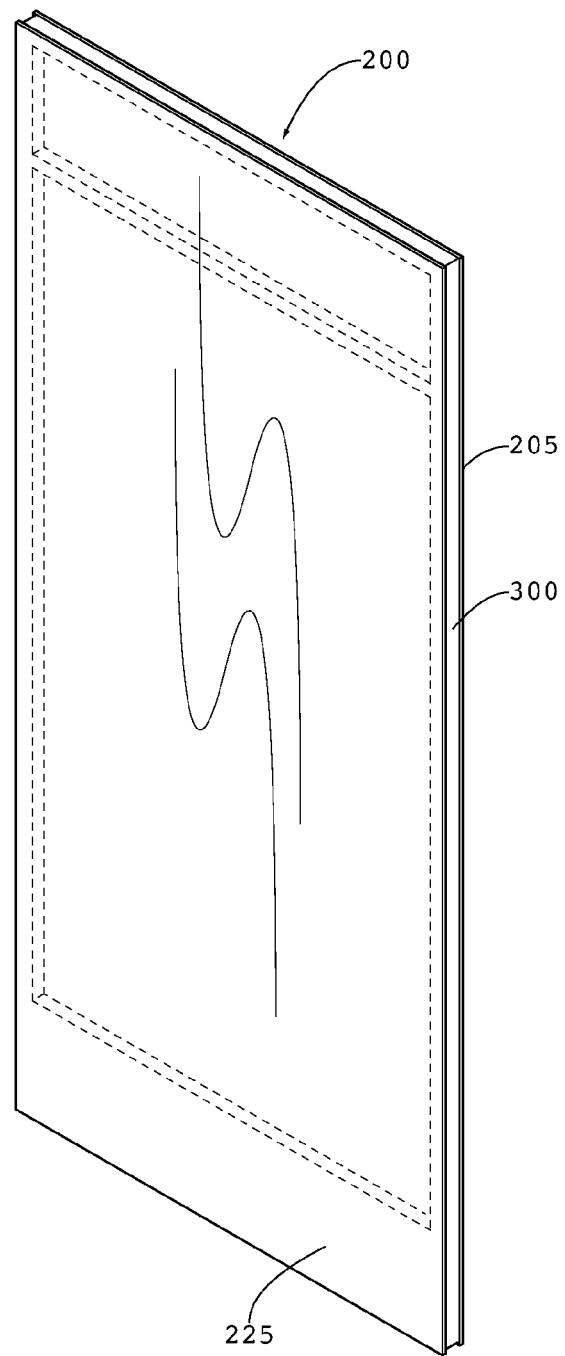
FIG. 8 is a perspective view of the sealed transparent LCD assembly 200 of FIGS. 1-2.

FIG. 8 is a perspective view of the sealed transparent LCD assembly 200 of FIGS. 1-2. Generally speaking, the assembly includes a spacer 300 which is sandwiched between a front glass 225 and rear glass 205. These components are preferably sealed together with an inert gas filling the sealed enclosure. The components are preferably gaseously sealed so that outside gas cannot penetrate into the assembly and any gas sealed within the assembly cannot substantially escape. Although not required for every embodiment, argon gas has been found to be preferred as the gas sealed within the assembly. For gaseously sealing these components together, it is preferable to use a hot melt polyurethane. Preferably, the spacer 300 is the Super Spacer® Standard from Quanex in Cambridge, Ohio www.quanex.com. In an exemplary embodiment, the spacer 300 would be a flexible foam that contains a desiccant and has a pressure sensitive acrylic adhesive on the front and back edges of the spacer which would be used to bond with the front and rear glass.

The embodiments of the wireless communication and transparent LCD system described herein can be used with any number of display case designs, either temperature controlled or not, and with doors that open or glass that remains stationary. Although shown here with a transparent LCD, the wireless system could be used with a traditional backlit LCD as well.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A sealed transparent LCD assembly comprising:
a front glass panel;
a rear glass panel;
a spacer positioned around a perimeter of the front and rear glass panels and sandwiched in between the front and rear glass panels to provide a gaseous seal between the front glass panel and the spacer as well as between the rear glass panel and the spacer;
a liquid crystal display (LCD) panel positioned between the front and rear glass panels; and
a wireless transmitter/receiver positioned adjacent to the LCD and between the front glass panel and rear glass panel.

2. The sealed transparent LCD assembly of claim 1 further comprising:
a plate bonded to the rear glass panel.

3. The sealed transparent LCD assembly of claim 2 wherein:
the wireless transmitter/receiver is attached to the plate.

4. The sealed transparent LCD assembly of claim 3 wherein:
the plate provides conductive thermal communication between the wireless transmitter/receiver and the rear glass.

5. The sealed transparent LCD assembly of claim 1 further comprising:
argon gas sealed between the front and rear glass panels and contacting the wireless transmitter/receiver.

6. The sealed transparent LCD assembly of claim 1 wherein:
the wireless transmitter/receiver accepts video data from a device placed outside of the sealed transparent LCD assembly.

7. The sealed transparent LCD assembly of claim 1 wherein:
the front and rear glass are positioned within a display case.

8. The sealed transparent LCD assembly of claim 1 wherein:
the front and rear glass are positioned within the door frame of a display case.

9. A display case comprising:
a housing;
a cavity within the housing;
a first wireless transmitter/receiver positioned within the cavity in the housing;
a door frame;
a transparent LCD assembly positioned within the door frame and comprising
a front glass panel,
a rear glass panel,
a liquid crystal display positioned between the front glass and rear glass panels, and
a spacer which surrounds the liquid crystal display and is sandwiched in between the front and rear glass panels to create a sealed cavity,
a second wireless transmitter/receiver positioned within the sealed cavity.

10. The display case of claim 9 further comprising:
a plate bonded to the rear glass panel.

11. The display case of claim 10 wherein:
the second wireless transmitter/receiver is attached to the plate.

12. The display case of claim 9 further comprising:
argon gas sealed between the front and rear glass panels and contacting the second wireless transmitter/receiver.

13. A display case comprising:
a housing;
a cavity within the housing;
a first wireless transmitter/receiver positioned within the cavity in the housing; and
a transparent LCD assembly positioned in front of the housing and comprising
a front glass panel,
a rear glass panel,
a spacer positioned around a perimeter of the front and rear glass panels and sandwiched in between the front and rear glass panels to define a gaseously sealed cavity, and
a liquid crystal display (LCD) panel positioned within the gaseously sealed cavity, and
a second wireless transmitter/receiver positioned within the gaseously sealed cavity which receives image data from the first wireless transmitter/receiver.

14. The display case of claim 13 further comprising:
a plate bonded to the rear glass panel.

15. The display case of claim 14 wherein:
the second wireless transmitter/receiver is attached to the plate.

16. The display case of claim 14 wherein:
the plate provides conductive thermal communication between the second wireless transmitter/receiver and the rear glass.

17. The display case of claim 13 further comprising:
argon gas sealed between the front and rear glass panels and contacting the second wireless transmitter/receiver.

18. The display case of claim 13 wherein:
the cavity within the housing is positioned below the transparent LCD assembly.

19. The display case of claim 13 wherein:
the spacer comprises a flexible foam that contains a desiccant.

20. The display case of claim 13 wherein:
the spacer defines the amount of spacing between the front glass panel and rear glass panel.

* * * * *